United States Patent [19]

Ogawa et al.

[11] 4,291,408
[45] Sep. 22, 1981

[54] SYSTEM FOR MONITORING BIT ERRORS

[75] Inventors: Kazuo Ogawa, Tokyo; Eiji Suzuki, Kawasaki, both of Japan

[73] Assignee: Fujitsu Limited, Japan

[21] Appl. No.: 98,988

[22] Filed: Nov. 30, 1979

[30] Foreign Application Priority Data

Dec. 5, 1978 [JP] Japan .................. 53-149678

[51] Int. Cl.³ ............................................. G06F 11/10
[52] U.S. Cl. ............................. 371/49; 371/22
[58] Field of Search .................... 371/22, 49

[56] References Cited

U.S. PATENT DOCUMENTS 3,159,809 12/1964 Fierston et al. .................. 371/49
3,278,898 10/1966 Rumble ............................. 371/49
3,914,741 10/1975 Bonser et al. .................... 371/49

Primary Examiner—Jerry Smith
Attorney, Agent, or Firm—Staas and Halsey

[57] ABSTRACT

A system for monitoring bit errors in digital differential phase modulation communications, comprising a parity counter for counting "1" pulses among n succesive bits at intervals of n bits (n is a positive integer) in a pulse train and for producing a parity bit. The parity bit is located in each side of a transmitter and a receiver, whereby, the parity bit counted in the receiver and the parity bit transmitted from the transmitter to the receiver are compared with each other.

13 Claims, 42 Drawing Figures

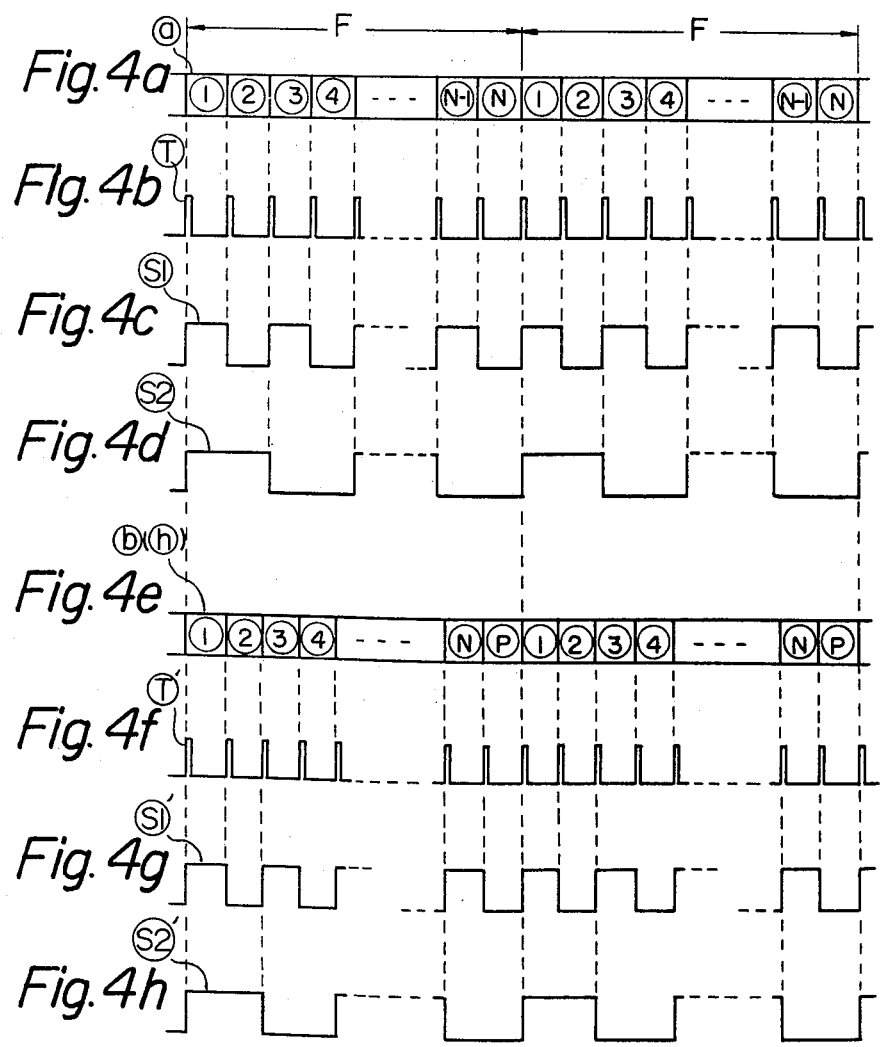

Fig. 7i
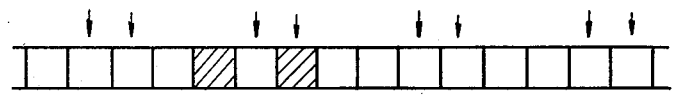
Fig. 7j
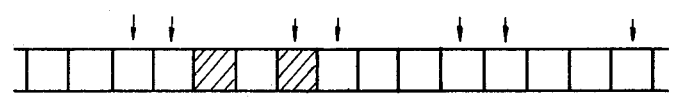
Fig. 7k
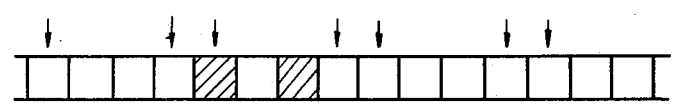
Fig. 7ℓ
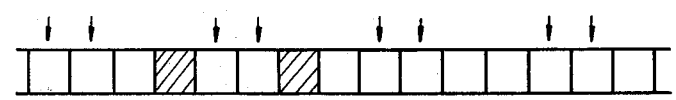
Fig. 7m
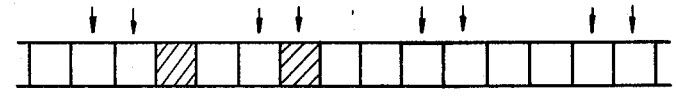
Fig. 7n
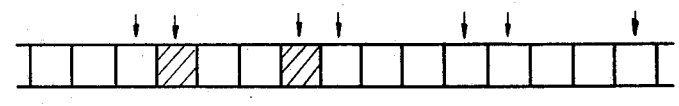
Fig. 7o
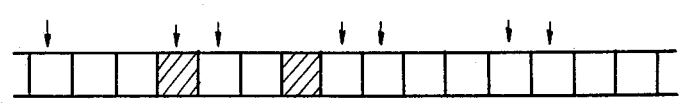
Fig. 7p

SYSTEM FOR MONITORING BIT ERRORS

BACKGROUND OF THE INVENTION

1. Field of the Invention

The present invention relates, generally, to a system for monitoring bit errors and, more particularly, to a system for monitoring bit errors in digital differential phase modulation communications. The bit errors are mainly generated in transmission lines and the probability of their generation is usually extremely small, for example, on the order of less than $10^{-3}$ or $10^{-4}$.

2. The Prior Art

Generally, differential phase modulation is used in digital communications. Such modulation is advantageous in that an absolute reference phase is unnecessary for demodulating a modulated signal, transmitted from a transmitter, in a receiver. In differential phase modulation information is represented by changes in carrier phase. The changes are responsive to relative changes between two successive bits in a pulse train. In digital differential phase modulation communications, bit errors may be generated due to failures of the components, failures in transmission lines and so on. Therefore, it is necessary to have a system for monitoring such bit errors.

One prior art system for monitoring bit errors in digital communications comprises a parity counter in each side of a transmitter and a receiver. The parity counter is used to count all the pulses in a pulse train whose length is a definite interval (hereinafter referred to as a frame) and to produce a parity bit whose value is "1" or "0", depending on whether the counted result is odd or even. In this system, a pulse in a pulse train represents a value "1". In the transmitter, the parity counter counts the number of pulses in the pulse train and the counted result is inserted as a first parity bit into the pulse train. Next, the pulse train, including the first parity bit, is transmitted from the transmitter to the receiver. In the receiver, the parity counter counts the number of pulses in the pulse train and produces the counted result as a second parity bit. Next, the second parity bit is compared with the transmitted first parity bit. As a result, when these parity bits are different from each other, a signal indicating the detection of bit errors is generated.

However, when the above-mentioned system is applied to digital differential phase modulation communications, bit errors can not be detected. Thus, the number of pulses in a pulse train is not changed and, accordingly, the parity bit, representing whether the number of pulses is odd or even, is not changed. This is because the bit representation of a transmitted signal in such digital communications is determined by a change relative to a preceding bit and, accordingly, one bit error causes another bit error, that is, bit errors are generated in pairs.

SUMMARY OF THE INVENTION

It is a principal object of the present invention to provide a system for monitoring bit errors in digital differential phase modulation communications, which can detect a part or all of the pairs of bit errors generated.

According to the present invention, there is provided a system for monitoring bit errors in digital differential phase modulation communications, comprising: a first parity counter means which counts "1" pulses among n successive bits at intervals of n bits (where n is a positive integer) in a first pulse train, and produces the counted result as a first parity bit; means for inserting the first parity bit into the first pulse train, the first pulse train and the first parity bit being converted into a second pulse train; differential encoder means for calculating modulo 2 sums of two successive bits of a digital signal transmitted from the inserting means; a phase modulator means for modulating a carrier with the calculated result by the differential encoder means; a demodulator means for demodulating a modulated signal transmitted from the phase modulator means; a differential decoder means for calculating modulo 2 differences between two successive elements of a demodulated digital signal transmitted from the demodulator means, whereby the second pulse train is reproduced; means for detecting the first parity bit in the reproduced second pulse train; a second parity counter means which counts "1" pulses among n successive bits at intervals of n bits in the reproduced second pulse train, except for the first parity bit, and which produces the counted result as a second parity bit; and means for comparing the first parity bit transmitted from the detecting means with the second parity bit transmitted from the second parity counter, whereby an error signal indicating generation of bit errors is produced from the comparing means when the first and second parity bits are different from each other.

There are various modes of bit error pairs generated in digital differential phase modulation communications. For example, in the case of digital four-phase differential phase modulation communications, the statistical generation ratio of two successive bit errors, two bit errors with a correct bit therebetween, and two bit errors with two correct bits therebetween is 1:2:1 at the output of a parallel-serial converter. In addition, it is known that bit errors may be produced stochastically and that the probability of the generation of bit errors is extremely small, for example, $10^{-4}$ or $10^{-5}$. Some bit errors can be detected by using a parity bit obtained by counting "1" pulses among n successive bits at intervals of n bits. In particular, by introducing the combination of a parity bit obtained by counting "1" pulses every other bit and a parity bit obtained by counting "1" pulses among two successive bits at intervals of two bits, all the bit errors can be detected and the speed of detection can be increased.

The present invention will be more clearly understood from the following description with reference to the accompanying drawings.

BRIEF DESCRIPTION OF THE DRAWINGS

FIGS. 4a through 4h are timing diagrams for explaining the operation of the system of FIG. 1 and the operation of the parity counter 12-1(25-1) and 12-2(25-2) of FIGS. 2 and 3;

DETAILED DESCRIPTION OF THE INVENTION

Figure 1:
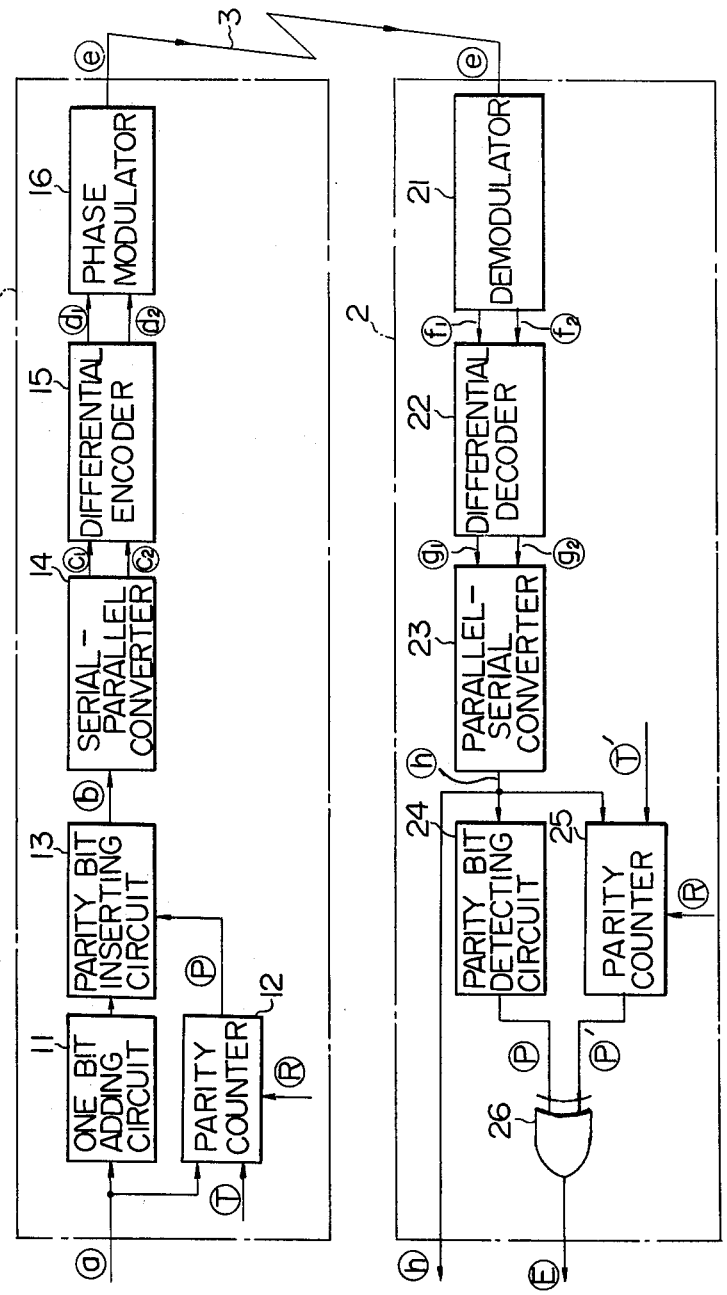
FIG. 1 is a block diagram illustrating a first embodiment of the bit error monitoring system of the present invention.

FIG. 1 is a block diagram illustrating a first embodiment of the bit error monitoring system of the present invention. The errors are generated in digital communications, for example, four-phase differential phase modulation systems. In FIG. 1, a phase-modulated signal "e" is transmitted from a transmitter 1 to a receiver 2 through a transmission line 3. A parity counter 12 in the transmitter 1 is the same as a parity counter 25 in the receiver 2. The parity counter 12 (or 25) counts "1" pulses among n successive bits at intervals of n bits (where n is a positive integer) in a pulse train "a" (or "h"), in synchronization with timing pulses T (or T'), and produces the counted result as a parity bit P (or P'). Operation of the system of FIG. 1 will now be explained.

FIGS. 4a, 4b, 4e and 4f are timing diagrams for explaining the operation of the system of FIG. 1. Referring to FIGS. 1, 4a, 4b, 4e and 4f, in the transmitter 1, a pulse train "a", where every frame F is composed of N bits, as shown in FIG. 4a, is converted into a pulse train where every frame F is composed of (N+1)bits, by a one bit adding circuit 11. The parity counter 12 counts "1" pulses among n successive bits at intervals of n bits in the pulse train "a" in synchronization with the timing pulses T as shown in FIG. 4b. The parity counter 12 produces the counted result as a parity bit P every one frame F. The parity bit P is inserted into the last bit of the above-mentioned (N+1) bits by a parity bit inserting circuit 13. Accordingly, the circuit 13 produces a pulse train "b" as shown in FIG. 4e. The pulse train "b" is divided into two pulse trains "C$_1$", and "C$_2$", whose transmission rate is half of the pulse train "b", by a serial-parallel converter 14. In this case, the pulse train "C$_1$" includes the (2m+1)th bit of the pulse train "b", while the pulse train "C$_2$" includes the (2m+2)th bit of the pulse train "b" (here, m equals 0, 1, 2, . . . ). After that, the pulse trains "C$_1$" and "C$_2$" are differentially encoded by a differential encoder 15 which supplies two pulse trains "d$_1$" and "d$_2$" to a phase modulator 16. In this case, the differential encoder 15 calculates modulo 2 sums of two successive elements of each of the pulse trains "C$_1$" and "C$_2$". The phase modulator 16 modulates a carrier with the pulse trains "d$_1$" and "d$_2$" together and transmits a modulated signal "e" to the receiver 2 through the transmission line 3. The carrier is supplied by two carrier sources (not shown) between which there is a phase difference of 90°.

In the receiver 2, the modulated signal "e" transmitted from the transmitter 1 is demodulated by a demodulator 21 which produces two pulse trains "f$_1$" and "f$_2$". After that, the pulse trains "f$_1$" and "f$_2$" are differentially decoded by a differential decoder 22 which produces two pulse train "g$_1$" and "g$_2$". In this case, the differential decoder 22 calculates modulo 2 differences between two successive elements of each of the pulse trains "f$_1$" and "f$_2$". The pulse trains "g$_1$" and "g$_2$" are unified into a pulse train "h", which is a reappearance of the pulse train "b" of the transmitter 1, by a parallel-serial converter 23. Next, the parity bit P included in the pulse train "h" is detected by a parity bit detecting circuit 24. On the other hand, the parity counter 25 counts "1" pulses among n successive bits at intervals of n bits in the pulse train "h", except for the parity bit P in synchronization with timing pulses T', as shown in FIG. 4f. The parity counter 25 produces the counted result as a parity bit P'. The parity bits P and P' are compared with each other by an exclusive OR gate 26. If these parity bits P and P' are different from each other, a signal E indicating generation of bit errors is produced from the exclusive OR gate 26. Thus, the parity bits P and P' are obtained by counting "1" pulses among n successive bits at intervals of n bits. A reset signal R is used to reset the parity counter 12 and 25 every one frame F.

Figure 2:
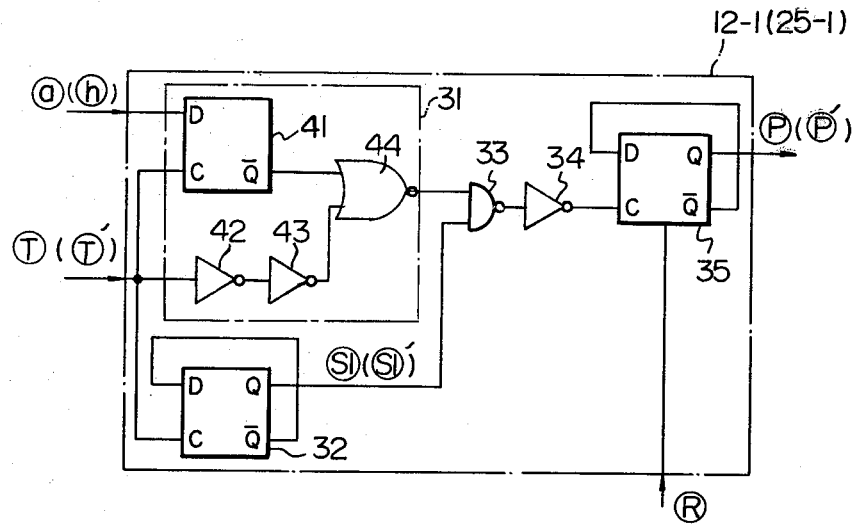
FIGS. 2 and 3 are circuit diagrams illustrating two examples of the parity counter 12(25) of FIG. 1.

The parity counter 12(25) will now be explained in detail. FIG. 2 is a circuit diagram illustrating an example of the parity counter 12(25) of FIG. 1, which counts "1" pulses at intervals of one bit (in this case, n equals 1). Referring to FIGS. 2, 4a, 4b, 4c, 4e, 4f and 4g, a pulse train "a" (or "h"), as shown in FIG. 4a (or 4e), is converted by a Return to Zero (RZ) conversion. An RZ converter 31 for effecting the RZ conversion comprises a D-type flip-flop 41 having a data input receiving the pulse train "a" (or "h") and a clock input receiving the timing pulses T (or T'), two inverters 42 and 43 connected in series receiving the timing pulses T (or T') and NOR gate 44 having two inputs connected to the outputs of the flip-flop 41 and the inverter 43. A D-type flip-flop 32 which serves as a half frequency divider receives the timing pulses T (or T') and generates a rectangular wave signal S1 (or S1'), as shown in FIG. 4c (or 4g). As a result, only the 1st bit, 3rd bit, 5th bit, . . . of the pulse train "a" (or "h") are transmitted through a NAND gate 33 and an inverter 34 to a D-type flip-flop 35. Therefore, the flip-flop 35 counts "1" pulses at intervals of one bit in the pulse train "a" (or "h") and produces the counted result as a parity bit P (or P').

Figure 3:
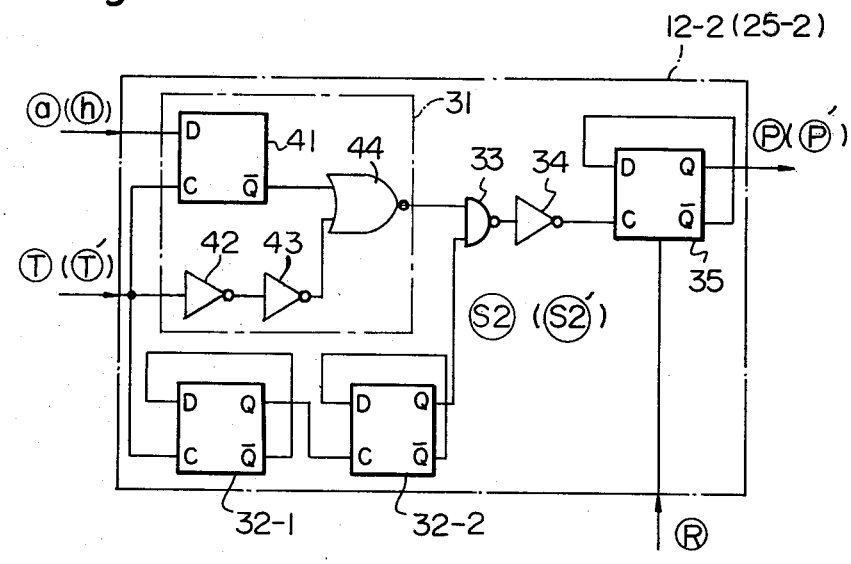

FIG. 3 is a circuit diagram illustrating another example of the parity counter 12(25) of FIG. 1, which counts "1" pulses among two successive bits at intervals of two bits (in this case, n equals 2). The elements illustrated in FIG. 3 which are identical to those of FIG. 2 are denoted by the same reference numerals as used in FIG. 2. In FIG. 3, two D-type flip-flops 32-1 and 32-2 connected in series are provided. Since each of the flip-flops 32-1 and 32-2 serves as a half frequency divider, the combination of the flip-flops 32-1 and 32-2 serves as a one fourth frequency divider. Therefore, the flip-flop 32-2 produces a rectangular wave signal S2 (or S2'), as shown in FIG. 4d (or 4h). As a result, only the 1st bit, 2nd bit, 5th bit, 6th bit, . . . of the pulse train "a" (or "h") are transmitted through a NAND gate 33 and an inverter 34 to a D-type flip-flop 35. Therefore, the flip-flop 35 counts "1" pulses among two successive bits at intervals of two bits in the pulse train "a" (or "h") and produces the counted result as a parity bit P (or P').

Generally, the parity counter 12 which can count "1" pulses among n successive bits at intervals of n bits in a pulse train comprises a 1/n frequency divider. Such a divider is, for example, formed by n D-type flip-flops 32 (FIG. 2) connected in series.

The bit errors in pairs generated in digital communications will now be explained. FIGS. 5a through 5e are illustrations of pulse trains for explaining the modes of bit errors generated in digital four-phase differential phase modulation communications. In such digital communications, a modulated signal transmitted from the transmitter 1 to the receiver 2 (FIG. 1) has two pulse trains indicated as channel I and channel II in FIG. 5a. The two pulse trains are converted into a pulse train by a parallel-serial converter 23 (FIG. 1) which samples pulses from the two pulse trains alternately. In addition, it is known that two successive bit errors of the modulated signal may be generated and that a one bit error may be not generated, due to the characteristics of differential phase modulation. For example, in the case of four-phase differential phase modulation, in FIG. 5a, one error in bits B1 and B2 causes one error in bits B3 and B4. Therefore, there are four kinds of bit error pairs generated at the parallel-serial converter 23(FIG. 1) as illustrated in FIGS. 5b through 5e. In these Figures, a shaded portion indicates a bit error. The statistical generation ratio of two successive bit errors (FIG. 5b), two bit errors with one correct bit therebetween (FIGS. 5c and 5d) and two bit errors with two correct bits therebetween (FIG. 5e) is 1:2:1.

Figure 5A:
FIGS. 5a through 5e are illustrations of pulse trains for explaining the modes of bit errors generated in digital communications by four-phase differential phase modulation.
Figure 5B:
Figure 5C:
Figure 5D:
Figure 5E:
Figure 6A:
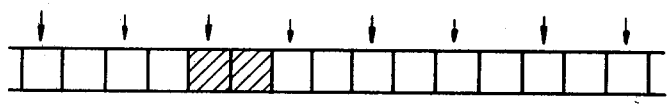
FIGS. 6a through 6h are illustrations of pulse trains for explaining the detection of bit errors by using the system of FIG. 1 including the parity counter 12-1(25-1) of FIG. 2.
Figure 6B:
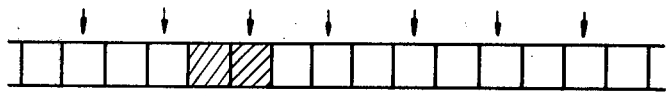
Figure 6C:
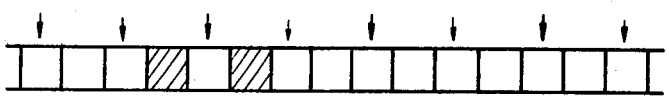
Figure 6D:
Figure 6E:
Figure 6F:
Figure 6G:
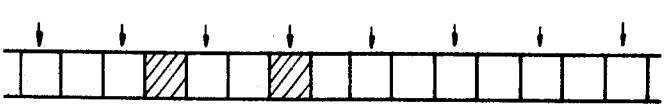
Figure 6H:

FIGS. 6a through 6h are illustrations of pulse trains for explaining the detection of bit errors by using the system of FIG. 1 including the parity counter 12-1(25-1) of FIG. 2. In FIGS. 6a through 6h, a bit associated with an arrow is a bit counted by the parity counter 12-1(25-1) and a shaded portion indicates a bit error. By counting "1" pulses at intervals of one bit in a pulse train, eight different combinations of counted bits and bit errors are generated as illustrated in FIGS. 6a through 6h. In other words, the bit errors as shown in FIG. 5b are monitored in two ways, as shown in FIGS. 6a and 6b. In addition, the bit errors as shown in FIGS. 5c and 5d are monitored in two ways, as shown in FIGS. 6c and 6d, and FIGS. 6e and 6f, respectively. Further, the bit errors as shown in FIG. 5e are monitored in two ways, as shown in FIGS. 6g and 6h. In four ways, as shown in FIGS. 6a, 6b, 6g and 6h, the number of "1" pulses changes from either odd or even to the other and, accordingly, the bit errors are detected. Contrary to this, in four ways in FIGS. 6c, 6d, 6e and 6f, the number of "1" pulses is not changed and, accordingly, the bit errors are not detected. Thus, by introducing the parity bit obtained by counting "1" pulses at intervals of one bit, 50 percent (4/8) of the bit errors generated in digital communications by four-phase differential phase modulation can be detected.

Figure 7A:
FIGS. 7a through 7p are illustrations of pulse trains for explaining the detection of bit errors by using the system of FIG. 1 including the parity counter 12-2(25-2) of FIG. 3.
Figure 7B:
Figure 7C:
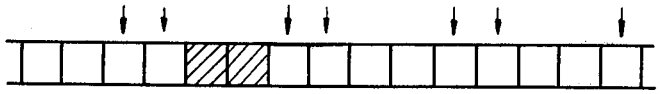
Figure 7D:
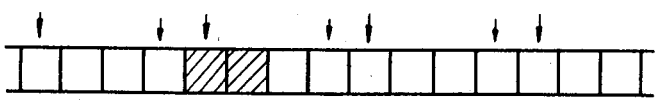
Figure 7E:
Figure 7F:
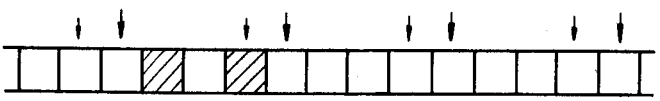
Figure 7G:
Figure 7H:

FIGS. 7a through 7p are illustrations of pulse trains for explaining the detection of bit errors by using the system of FIG. 1 including the parity counter 12-2(25-2) of FIG. 3. By counting "1" pulses among two successive bits at intervals of two bits in a pulse train, sixteen kinds of combinations of counted bits and bit errors are generated as illustrated in FIGS. 7a through 7p. In other words, the bit errors as shown in FIG. 5b are monitored in four ways, as shown in FIGS. 7a through 7d. In addition, the bit errors as shown in FIGS. 5c and 5d are monitored in four ways, as shown in FIGS. 7e through 7h and FIGS. 7i through 7l, respectively. Further, the bit errors as shown in FIG. 5e are monitored in four ways, as shown in FIGS. 7m through 7p. In twelve cases, as shown in FIGS. 7b, 7d through 7l, 7n and 7p, the number of "1" pulses changed from either odd or even to the other and, accordingly, the bit errors are detected. Contrary to this, in four ways, as shown in FIGS. 7a, 7c, 7m and 7o, the number of "1" pulses is not changed and, accordingly, the bit errors are not detected. Thus, by introducing the parity bit obtained by counting "1" pulses amoung two successive bits at intervals of two bits, 75 percent (12/16) of the bit errors generated in digital communications by four-phase differential phase modulation can be detected.

Generally, by introducing the parity bit obtained by counting "1" pulses among n successive bits at intervals of n bits, a part of the bit errors generated in digital four-phase differential phase modulation communications, can be detected. Therefore, the system of FIG. 1, which is capable of detecting a part of the bit errors, will never fail to detect such bit errors if the monitoring time is long sufficiently, since bit errors in digital communications are generated stochastically.

Figure 8:
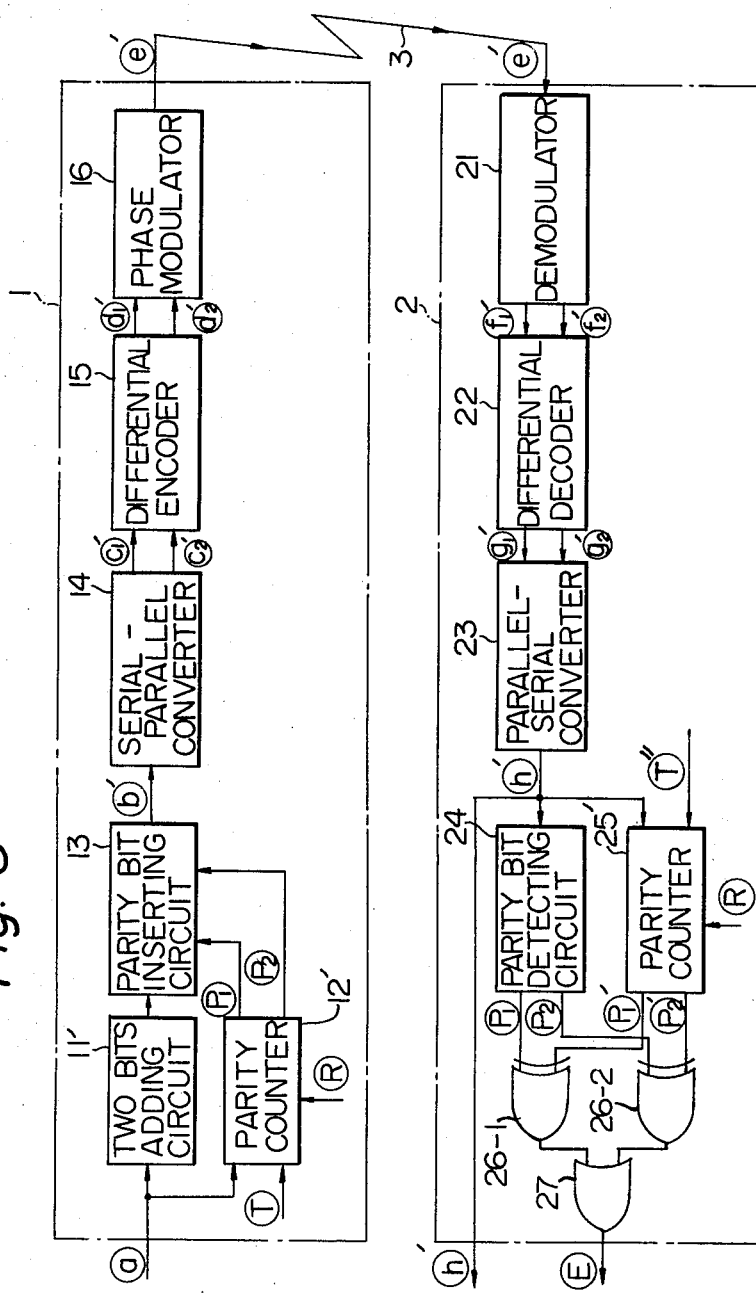
FIG. 8 is a block diagram illustrating a second embodiment of the bit error monitoring system of the present invention.

FIG. 8 is a block diagram illustrating a second embodiment of the system, for monitoring bit errors of the present invention, in which two parity bits are introduced for increasing the speed of detecting the bit errors. The elements in FIG. 8 which are identical to those of FIG. 1 are denoted by the same reference numerals as used in FIG. 1. In a transmitter 1, a pulse train "a", where every frame F is composded of N bits, as shown in FIG. 4a, is converted into a pulse train where every frame F is composed of (N+2) bits, by a two bits adding circuit 11'. A parity counter 12' pulses among $n_1$ successive bits at intervals of $n_1$ bits and, simulataneously, counts "1" pulses among $n_2$ successive bits at intervals of $n_2$ bits in the pulse train "a", synchronizing with timing pulses T, as shown in FIG. 4b. Here, $n_1$ and $n_2$ which are positive integers are different from each other. The parity counter 12' produces each of the counted results as parity bits $P_1$ and $P_2$, respectively, every one frame F. The parity bits $P_1$ and $P_2$ are inserted into the two last bits of the above-mentioned (N+2) bits by a parity inserting circuit 13 which produces a pulse train "b'". The pulse train "b'" is divided into two pulses trains "$C_1'$" and "$C_2'$" by a serial-parallel converter 14. Next, the pulse trains "$C_1'$" and "$C_2'$" are differentially encoded by a differential encoder 15, which supplies two pulse trains "$d_1'$" and "$d_2'$" to a phase modulator 16. In this case, the differential encoder calculates modulo sums of two successive elements of each of the pulse trains "$C_1'$" and "$C_2'$". The phase modulator 16 modulates a carrier with the pulse trains "$d_1'$" and "$d_2'$" together, and transmits a modulated signal "e'" through a transmission line 3 to a receiver 2.

In the receiver 2, in the same manner as described in FIG. 1, the modulated signal "e'" transmitted from the transmitter 1 is demodulated by a demodulator 21 which produces two pulse trains "$f_1'$" and "$f_2'$". After that, the pulse trains "$f_1'$" and "$f_2'$" are differentially decoded by a differential decoder 22 which produces two pulse trains "$g_1'$" and "$g_2'$". In this case, the differential decoder calculates modulo 4 differences of two successive elements of each of the pulse trains "$f_1'$" and "$f_2'$". The pulse trains "$g_1'$" and "$g_2'$" are unified into a pulse train "h'", which is a reappearance of the pulse train "b'" of the transmitter 1, by a parallel-serial converter 23. Next, the parity bits $P_1$ and $P_2$ included in the pulse train "h'" are detected by a parity detecting circuit 24. On the other hand, a parity counter 25' counts "1" pulses among $n_1$ successive bits at intervals of $n_1$ and, simultaneously, counts "1" pulses among $n_2$ successive bits at intervals of $n_2$ bits in the pulse train "h'", synchronizing with timing pulses T'''. The parity counter 25' produces each of the counted results as parity bits $P_1'$ and $P_2'$, respectively, every one frame F. The parity bits $P_1$ and $P_1'$ are compared with each other by an exclusive OR gate 26-1, while the parity bits $P_2$ and $P_2'$ are compared with each other by an exclusive OR gate 26-2. If the parity bit $P_1$ is different from the parity bit $P_1'$, or if the parity bit $P_2$ is different from the parity bit $P_2'$, a signal E indicating generation of bit errors is produced from an OR gate 27. Thus, by introducing two kinds of parity bits obtained by different counting methods, the probability of detecting bit errors is increased and, accordingly, the speed of detecting bit errors is also increased. The parity counter 12' which is the same type as the parity counter 25' will now be explained in detail.

Figure 9:
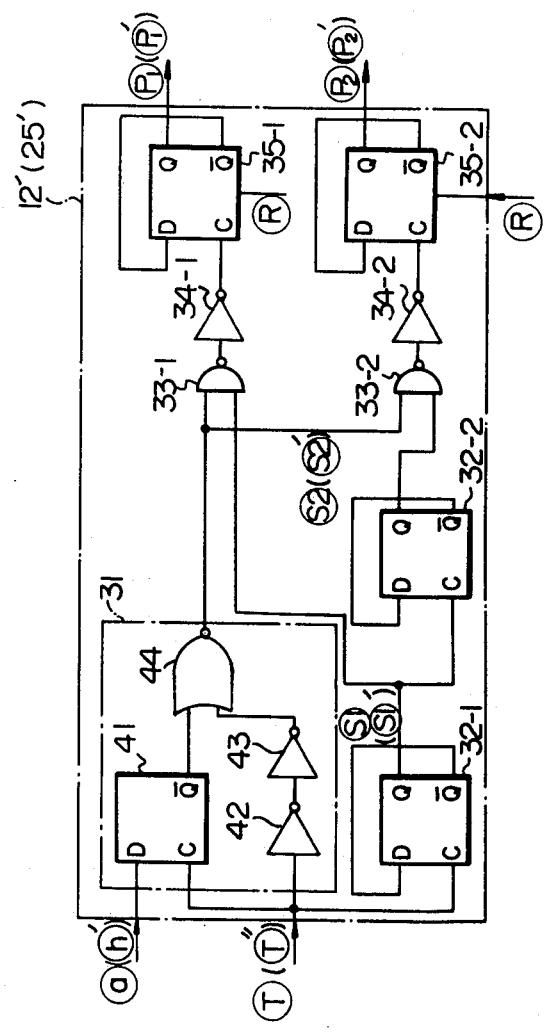
FIG. 9 is a circuit diagram illustrating an example of the parity counter 12'(25') of FIG. 8.

FIG. 9 is a circuit diagram illustrating an example of the parity counter 12'(25') of FIG. 8. The elements illustrated in FIG. 9 which are identical with those of FIG. 2 or 3 are denoted by the same reference numerals as used in FIG. 2 or 3. The parity counter 12'(25') counts "1" pulses at intervals of one bit ($n_1$ equals 1) and, simultaneously, counts "1" pulses among two successive bits at intervals of two bits ($n_2$ equals 2) in a pulse train. The parity counter 12'(25') is formed by combining the parity counter 12-1(25-1) of FIG. 2 and the parity counter 12-2(25-2) of FIG. 3. Since a D-type flip-flop 32-1 produces a rectangular wave signal S1 (or S1'), as shown in FIG. 4c (or 4g), only the 1st bit, 3rd bit 5th bit, . . . of the pulse train "a" (or "h'") are transmitted from a RZ converter 31 through a NAND gate 33-1 and an inverter 34-1 to a D-type flip-flop 35-1. As a result, the flip-flop 35-1 counts "1" pulses at intervals of one bit in the pulse train "a" (or "h'") and produces the counted result as a parity bit $P_1$ (or $P_1'$). On the other hand, since a D-type flip-flop 32-2 produces a rectangular wave signal S2 (or S2'), as shown in FIG. 4d (or 4h), only the 1st bit, 2nd bit, 5th bit, 6th bit, . . . of the pulse train "a" (or "h'") are transmitted from the RZ converter 31 through a NAND gate 33-2 and an inverter 34-2 to a D-type flip-flop 35-2. As a result, the flip-flop 35-2 counts "1" pulses among two bits at intervals of two bits in the pulse train "a" (or "h'") and produces the counted result as parity bit $P_2$ (or $P_2'$). Thus, the parity counter 12'(25') produces two parity bits $P_1$ (or $P_1'$) and $P_2$ (or $P_2'$) simultaneously.

The detection of bit errors in pairs by using the system of FIG. 8 including the parity counter 12'(25') of FIG. 9 will now be explained. In the case of two successive bit errors, as illustrated in FIG. 5b, the flip-flop 35-1 (FIG. 9) counts "1" pulses, as shown in FIGS. 6a and 6b, and, accordingly, the parity bit $P_1'$ becomes different from the parity bit $P_1$. In addition, in the case of two bit errors with a normal bit therebetween, as illustrated in FIGS. 5c and 5d, the flip-flop 35-2 (FIG. 9) counts "1" pulses, as shown in FIGS. 7e through 7l and, accordingly, the parity bit $P_2'$ becomes different from the parity bit $P_2$. Further, in the case of two bit errors with two normal bits therebetween, as illustrated in FIG. 5e, the flip-flop 35-1 (FIG. 9) counts "1" pulses, as shown in FIGS. 6g and 6h and, accordingly, the parity bit $P_1'$ becomes different from the parity bit $P_1$. Thus, a difference between the parity bits $P_1$ and $P_1'$ or a difference between the parity bits $P_2$ and $P_2'$ is generated. Therefore, all bit error pairs generated in digital four-phase differential phase modulation communications can be detected and the speed of detection can be increased.

In the case of digital two-phase differential phase modulation communications, it should be noted that the serial-parallel converter 14 of the transmitter 1 and the parallel-serial converter 23 of the receiver 2 are omitted. In addition, only two successive bit errors, as illustrated in FIG. 5b may be generated and two bit errors, as shown in FIGS. 5c, 5d and 5e can not be generated. Therefore, all bit errors in pairs generated in digital two-phase differential phase modulation communications can be detected by using the system illustrated in FIG. 1, including the parity counter 12-1(25-1) illustrated in FIG. 2, without a serial-parallel converter and a parallel-serial converter.

As explained hereinbefore, the system for monitoring bit errors in digital differential phase modulation communications according to the present invention as compared with those of the prior art has the advantage that a part or all bit errors can be detected. The bit error rate which may be detected is, for example, on the order of less than $10^{-3}$ or $10^{-4}$, such as two successive bit errors, two bit errors with a correct bit therebetween and two bit errors with two correct bits therebetween.

What is claimed is:

1. A system, operatively connected to means for generating a first pulse train having "1" pulses, and means for receiving a carrier signal, for monitoring bit errors in digital differential phase modulation communications, comprising:

first parity counter means for counting the "1" pulses among n successive bits at intervals of n bits, where n is a positive integer, in the first pulse train, and for providing the counted result as a first parity bit;

inserting means, operatively connected to said first parity counter means, for inserting said first parity bit into the first pulse train, the first pulse train and said first parity bit being converted into a second pulse train;

differential encoder means, operatively connected to said inserting means, for calculating modulo 2 sums of two successive elements of said second pulse train to provide a calculation signal;

phase modulator means, operatively connected to said differential encoder means, for modulating the carrier signal with said calculation signal and for transmitting a modulated signal;

demodulator means, operatively connected to said phase modulator means, for demodulating said modulated signal to provide a demodulated signal;

differential decoder means, operatively connected to said demodulator means, for calculating modulo 2 differences between two successive elements of said demodulated signal to reproduce said second pulse train;

detecting means, operatively connected to said differential decoder means, for detecting said first parity bit in said reproduced second pulse train;

second parity counter means, operatively connected to said differential decoder means, for counting "1" pulses among n successive bits at intervals of n bits in said reproduced second pulse train except for said first parity bit and for producing the counted result as a second parity bit; and comparing means, operatively connected to said second parity counter means and said detecting means, for comparing said first parity bit with said second parity bit, and for generating an error signal when said first and second parity bits are different from each other, said error signal indicating the generation of bit errors.

2. A system as set forth in claim 1, wherein n equals 1.

3. A system as set forth in claim 2, wherein said system is operatively connected to receive a timing pulse signal, wherein said first parity counter means comprises:
- a first RZ convertor, having an output, for providing return-to-zero conversion on said first pulse train;
- a first half frequency divider, having an output, for dividing timing pulses synchronized with said first pulse train;
- first NAND gate means connected to the outputs of said first RZ convertor and said first half frequency divider; and
- first counting means, operatively connected to said first NAND gate means, for counting "1" pulses generated by said first NAND gate means and for producing said first parity bit; and wherein said second parity counter means comprises:
  - a second RZ converter, having an output, for providing return-to-zero conversion on said reproduced second pulse train;
  - a second half frequency divider, having an output, for dividing timing pulses synchronized with said reproduced second pulse train;
  - second NAND gate means connected to the outputs of said second RZ convertor and said second half frequency divider; and
  - second counting means, operatively connected to said second NAND gate means, for counting "1" pulses generated by said second NAND gate means and for producing said second parity bit.

4. A system as set forth in claim 3, wherein each of said first and second half frequency dividers and said first and second counting means comprises a D-type flip-flop.

5. A system as set forth in claim 1, wherein n equals 2.

6. A system as set forth in claim 5, wherein said system is operatively connected to receive a timing pulse signal, wherein said first parity counter means comprises:
- a first RZ convertor, having an output, for providing return-to-zero conversion on said first pulse train;
- a first one-fourth frequency divider, having an output, for dividing timing pulses synchronized with said first pulse train;
- first NAND gate means, connected to the outputs of said first RZ convertor and said first one-fourth frequency divider, for generating "1" pulses; and
- first counting means for counting the "1" pulses generated by said first NAND gate means and for producing said first parity bit; and wherein said second parity counter means comprises:
  - a second RZ convertor, having an output, for providing return-to-zero conversion on said reproduced second pulse train;
  - a second one-fourth frequency divider, having an output, for dividing timing pulses synchronized with said reproduced second pulse train;
  - second NAND gate means, connected to the outputs of said second RZ convertor and said second one-fourth frequency divider, for generating "1" pulses; and
  - second counter means for counting the "1" pulses generated by said second NAND gate means and for producing said second parity bit.

7. A system as set forth in claim 6, wherein each of said first and second one fourth frequency divider comprises two D-type flip-flops connected in series and wherein each of said first and second counting means comprises a D-type flip-flop.

8. A system, operatively connected to means for generating a first pulse train, having "1" pulses, and means for receiving a carrier signal, for monitoring bit errors in digital differential phase modulation communications, comprising:
- first parity counter means for counting "1" pulses among $n_1$ successive bits at intervals of $n_1$ bits and, for simultaneously counting "1" pulses among $n_2$ successive bits at intervals of $n_2$ bits in the first pulse train, where $n_1$ and $n_2$ are positive integers and are different from each other, and for producing the counted results as first and second parity bits, respectively;
- inserting means, operatively connected to said first parity counter means, for inserting said first and second parity bits into the first pulse train, the first pulse train and said first and second parity bits being converted into a second pulse train;
- differential encoder means, operatively connected to said inserting means, for calculating modulo 4 sums of two successive elements of said second pulse train to provide a calculation signal;
- phase modulator means, operatively connected to said differential encoder means, for modulating the carrier signal with said calculation signal and for transmitting a modulated signal;
- demodulator means, operatively connected to said phase modulator means, for demodulating said modulated signal to provide a demodulated signal;
- differential decoder means, operatively connected to said demodulator means, for calculating modulo 4 differences between two successive elements of said demodulated signal to reproduce said second pulse train;
- detecting means, operatively connected to said differential decoder means, for detecting said first and second parity bits in said reproduced second pulse train;
- second parity counter means, operatively connected to said differential decoder means, for counting "1" pulses among $n_1$ successive bits at intervals of $n_1$ bits and, for simultaneously counting "1" pulses among $n_2$ successive bits at intervals of $n_2$ bits in said reproduced second pulse train except for said first and second parity bits and for producing the counted results as third and fourth parity bits, respectively;
- first means, operatively connected to said detecting means and said second parity counter means, for comparing said first parity bit and said third parity bit;
- second means, operatively connected to said detecting means and said second parity counter means, for comparing said second parity bit and said fourth parity bit; and
- OR gate means, connected to the outputs of said first and second comparing means, for generating an error signal when said first and third parity bits are different from each other, or when said second and fourth parity bits are different from each other, said error signal indicating the generation of bit errors.

9. A system as set forth in claim 8, wherein $n_1$ and $n_2$ equal 1 and 2, respectively.

10. A system as set forth in claim 9, wherein said system is operatively connected to receive a timing pulse signal, and wherein said first parity counter means comprises:

a first RZ convertor, having an output, for providing return-to-zero conversion on said first pulse train;

a first half frequency divider, having an output, for dividing timing pulses synchronized with said first pulse train;

a second half frequency divider, having an output, for dividing the output signal of said first half frequency divider;

first NAND gate means, connected to the outputs of said first RZ convertor and said first half frequency divider, for generating "1" pulses;

second NAND gate means, connected to the outputs of said first RZ convertor and said second half frequency divider for generating "1" pulses;

first means, operatively connected to said first NAND gate means, for counting the "1" pulses generated from said first NAND gate means and for producing said first parity bit;

second means, operatively connected to said second NAND gate means, for counting the "1" pulses generated from said second NAND gate means and for producing said second parity bit; and wherein said second parity counter means comprises:

a second RZ convertor, having an output, for effecting return-to-zero conversion on said reproduced second pulse train;

a third half frequency divider, having an output, for dividing timing pulses synchronized with said reproduced second pulse train;

a fourth half frequency divider, having an output, for dividing the output signal of said third half frequency divider;

third NAND gate means, connected to the outputs of said second RZ convertor and said third half frequency divider, for generating "1" pulses;

fourth NAND gate means, connected to the outputs of said second RZ convertor and said fourth half frequency divider, for generating "1" pulses;

third means, operatively connected to said third NAND gate means, for counting the "1" pulses generated by said third NAND gate means and for producing said third parity bit; and fourth means, operatively connected to said fourth NAND gate means, for counting "1" pulses generated by said fourth NAND gate means and for producing said fourth parity bit.

11. A system as set forth in claim 10, wherein each of said first, second, third and fourth half frequency dividers, and each of said first, second, third and fourth counting means comprises D-type flip-flops.

12. A system, operatively connected to means for generating a first pulse train having "1" pulses, and operatively connected to means for receiving a carrier signal, for monitoring bit errors in digital differential phase modulation communications, comprising:

first parity counter means for counting the "1" pulses among n successive bits at intervals of n bits, where n is a positive integer, in the first pulse train, and for providing the counted results as a first parity bit;

inserting means, operatively connected to said first parity counter means, for inserting said first parity bit into the first pulse train, the first pulse train and said first parity bit being converted into a second pulse train;

serial-parallel convertor means, operatively connected to said inserting means, for converting said second pulse train into a two-channel pulse train having a transmission rate which is one-half the rate of said second pulse train;

differential encoder means, operatively connected to said serial-parallel convertor means, for calculating modulo 2 sums of two successive elements of said two-channel pulse train to provide a calculation signal;

phase modulator means, operatively connected to said differential encoder means, for modulating the carrier signal with said calculation signal and for transmitting a modulated signal;

demodulator means, operatively connected to said phase modulator means, for demodulating said modulated signal to provide a demodulated signal;

differential decoder means, operatively connected to said demodulator means, for calculating modulo 2 differences between two successive elements of said demodulated signal to reproduce said two-channel pulse train;

parallel-serial convertor means, operatively connected to said differential decoder means, for reproducing said second pulse train from said reproduced two-channel pulse train;

detecting means, operatively connected to said parallel-serial convertor means, for detecting said first parity bit in said reproduced second pulse train;

second parity counter means, operatively connected to said parallel-serial convertor means, for counting "1" pulses among n successive bits at intervals of n bits in said reproduced second pulse train except for said first parity bit and for producing the counted result as a second parity bit; and comparing means, operatively connected to said second parity counter means and said detecting means, for comparing said first parity bit with said second parity bit and for generating an error signal when said first and second parity bits are different from each other, said error signal indicating the generation of bit errors.

13. A system, operatively connected to means for generating a first pulse train, having "1" pulses, and means for receiving a carrier signal, for monitoring bit errors in digital four-phase differential phase modulation communications, comprising:

first counter means for counting "1" pulses among $n_1$ successive bits at intervals of $n_1$ bits and, for simultaneously counting "1" pulses among $n_2$ successive bits at intervals of $n_2$ bits in the first pulse train, where $n_1$ and $n_2$ are positive integers and are different from each other, and for producing the counted results as first and second parity bits, respectively;

inserting means, operatively connected to said first counter means for inserting said first and second parity bits into the first pulse train, the first pulse train and said first and second parity bits being converted into a second pulse train;

serial-parallel convertor means, operatively connected to said inserting means, for converting said second pulse train into a two-channel pulse train having a transmission rate which is one half of said second pulse train;

differential encoder means, operatively connected to said serial-parallel convertor means, for calculating modulo 4 sums of two successive elements of said two-channel pulse train to provide a calculation signal;

phase modulator means, operatively connected to said differentail encoder means, for modulating the carrier signal with said calculation signal and for transmitting a modulated signal;

demodulator means, operatively connected to said phase modulator means, for demodulating said modulated signal to provide a demodulated signal;

differential decoder means, operatively connected to said demodulator means, for calculating modulo 4 differences between two successive elements of said demodulated signal to reproduce said two-channel pulse train;

parallel-serial convertor means, operatively connected to said differential decoder means, for reproducing said second pulse train from said reproduced two-channel pulse train;

detecting means, operatively connected to said parallel-serial convertor means, for detecting said first and second parity bits in said reproduced second pulse train;

second counter means, operatively connected to said parallel-serial convertor means, for counting "1" pulses among $n_1$ successive bits at intervals of $n_1$ bits and, for simultaneously counting "1" pulses among $n_2$ successive bits at said intervals of $n_2$ bits in said reproduced second pulse train except for said first and second parity bits and for producing the counted results as third and fourth parity bits, respectively;

first comparing means, operatively connected to said detecting means and said second counter means, for comparing said first parity bit and said third parity bit;

second comparing means, operatively connected to said detecting means and said second counter means, for comparing said second parity bit and said fourth parity bit; and OR gate means, connected to the outputs of said first and second comparing means, for generating an error signal when said first and third parity bits are different from each other, or when said second and fourth parity bits are different from each other, said error signal indicating the generation of bit errors.

* * * * *

UNITED STATES PATENT AND TRADEMARK OFFICE
CERTIFICATE OF CORRECTION

PATENT NO. : 4,291,408
DATED : September 22, 1981
INVENTOR(S) : OGAWA ET AL.

It is certified that error appears in the above—identified patent and that said Letters Patent is hereby corrected as shown below:

```
Front page, [73] Assignee, after "Limited," insert
                --Kawasaki,--.
Column 4, line 24, change the heavy type numeral "1)"
                  to the regular type numeral --1--.
Column 6, line 13, after "tions" delete ",";
         line 25, change "composded" to --composed--;
         line 28, after "12'" insert --counts "1"--;
         line 29, change "simulatane" to --simultane--;
         line 40, change "pulses" to --pulse--;
         line 45, after "modulo" insert --4--.
Column 7, line 29, at the end of the line insert --,--.
Column 11, line 22, after "divider" insert --,--.
Column 13, line 9, change "differentail" to --differential--.
```

Signed and Sealed this

Twenty-third Day of February 1982

[SEAL]

Attest:

GERALD J. MOSSINGHOFF

Attesting Officer

Commissioner of Patents and Trademarks